(12) United States Patent
Kang

(10) Patent No.: US 11,718,946 B2
(45) Date of Patent: Aug. 8, 2023

(54) LAUNDRY TREATMENT MACHINE

(71) Applicant: LG ELECTRONICS INC., Seoul (KR)

(72) Inventor: Jinkeun Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/747,725

(22) Filed: Jan. 21, 2020

(65) Prior Publication Data

US 2020/0232135 A1 Jul. 23, 2020

(30) Foreign Application Priority Data

Jan. 21, 2019 (KR) ........................ 10-2019-0007313

(51) Int. Cl.
| | |
|---|---|
| *D06F 33/42* | (2020.01) |
| *D06F 39/08* | (2006.01) |
| *H02P 27/08* | (2006.01) |
| *H02P 23/14* | (2006.01) |
| *H02M 7/5387* | (2007.01) |
| *D06F 105/58* | (2020.01) |

(Continued)

(52) U.S. Cl.
CPC ............ *D06F 33/42* (2020.02); *D06F 39/085* (2013.01); *D06F 39/087* (2013.01); *H02M 7/53871* (2013.01); *H02P 23/14* (2013.01); *H02P 27/08* (2013.01); *D06F 2103/18* (2020.02); *D06F 2105/08* (2020.02); *D06F 2105/58* (2020.02)

(58) Field of Classification Search
CPC ...... D06F 33/42; D06F 39/087; D06F 39/085; D06F 2105/58; D06F 2103/18; D06F 2105/08; D06F 2103/48; H02P 27/08; H02P 23/14; H02P 2205/03; H02M 7/53871

See application file for complete search history.

(56) References Cited

U.S. PATENT DOCUMENTS

| | | | |
|---|---|---|---|
| 2003/0056300 A1* | 3/2003 | Ruhl | .................... D06F 39/085 8/158 |
| 2004/0088797 A1* | 5/2004 | Darby | .................. D06F 39/085 8/159 |

(Continued)

FOREIGN PATENT DOCUMENTS

| | | |
|---|---|---|
| JP | 2001-276485 | 10/2001 |
| JP | 2002-166090 | 6/2002 |

*Primary Examiner* — Michael E Barr
*Assistant Examiner* — Pallavi Chitta
(74) *Attorney, Agent, or Firm* — Ked & Associates, LLP

(57) ABSTRACT

A laundry treatment machine includes a washing tub, a washing tub motor, a water level sensor, a drain pump, a motor to operate the drain pump, a converter to output DC power, an inverter to convert the DC power into AC power, and a controller to, when power consumed by the motor during a drainage operation does not reach first power, perform control to increase a speed of the motor or the power consumed by the motor, and when the power consumed by the motor during the drainage operation reaches the first power and remains within a first range corresponding to the first power and then falls from the first range, output a drainage completion message. Accordingly, it is possible to quickly and accurately determine the completion of the operation of the drain pump. Therefore, it is possible to shorten the drainage time and reduce the waste of power.

17 Claims, 13 Drawing Sheets

(51) Int. Cl.
  *D06F 103/18* (2020.01)
  *D06F 105/08* (2020.01)

(56) References Cited

U.S. PATENT DOCUMENTS

| | | | |
|---|---|---|---|
| 2005/0088136 A1* | 4/2005 | Kitajima | H02P 27/08 318/801 |
| 2016/0115632 A1* | 4/2016 | Jung | D06F 39/087 8/137 |
| 2017/0302208 A1* | 10/2017 | Je | H02P 21/05 |
| 2019/0127903 A1* | 5/2019 | Je | D06F 37/12 |

* cited by examiner

LAUNDRY TREATMENT MACHINE

CROSS-REFERENCE TO RELATED APPLICATION

This application claims the priority benefit of Korean Patent Application No. 10-2019-0007313, filed on Jan. 21, 2019 in the Korean Intellectual Property Office, the disclosure of which is incorporated herein by reference.

BACKGROUND OF THE INVENTION

1. Field of the Invention

The present disclosure relates to a laundry treatment machine and, more particularly, to a laundry treatment machine capable of quickly and accurately determining completion of an operation of a drain pump.

In addition, the present disclosure also relates to a laundry treatment machine capable of driving a drain pump motor in a sensorless manner.

In addition, the present disclosure also relates to a laundry treatment machine capable of improving stability of a converter.

The present disclosure also relates to a laundry treatment machine capable of shortening a drainage completion period.

2. Related Art

For drainage, a drain pump driving apparatus drives a motor to drain water input to a water introduction part to an outside.

The drainage pump driving apparatus, which generally drives a motor by a constant speed operation with input AC power in order to drive the drainage pump, discharges water input to the water introduction part to the outside for drainage.

When using an AC pump motor in order to drive a drain pump, the motor is generally driven by the constant speed operation with the input AC power.

For example, when a frequency of the input AC power is 50 Hz, the drain pump motor rotates at 3000 rpm, and, when a frequency of the input AC power is 60 Hz, the drain pump motor rotates at 3600 rpm.

Due to such an AC pump motor, a speed control of the motor is not performed at the time of drainage, and thus, there is a drawback in that a drainage period takes a long time.

In order to address the drawback, researches are being conducted to apply a DC brushless motor as a drain pump motor.

Japanese Patent Laid-Open Publication Nos. 2001-276485 and 2002-166090 exemplify a drain pump motor based on a DC brushless motor.

In these related arts, a speed control is performed when controlling the drain pump motor, and thus, there is a drawback in that a drainage completion period takes a long time.

Meanwhile, when a water level sensor is used to determine whether drainage is completed, there are drawbacks in that it is difficult to accurately determine the completion of the drainage and that it takes a considerable time.

SUMMARY OF THE INVENTION

The present disclosure has been made in view of the above problems, and it is an object of the present disclosure to provide a laundry treatment machine capable of quickly and accurately determining completion of an operation of a drain pump.

The present disclosure also provides a laundry treatment machine capable of driving a drain pump motor in a sensorless manner.

The present disclosure also provides a laundry treatment machine capable of improving stability of a converter.

The present disclosure also provides a laundry treatment machine capable of shortening a drainage completion period.

In accordance with an aspect of the present disclosure, the above and other objects can be accomplished by the provision of a laundry treatment machine including a washing tub, a washing tub motor configured to rotate the washing tub, a water level sensor configured to sense a water level of the washing tub, a drain pump configured to operate to drain the washing tub, a motor configured to operate the drain pump, a converter configured to output DC power, an inverter configured to convert the DC power from the converter into AC power by a switching operation and output the converted AC power to the motor, and a controller configured to, when power consumed by the motor during a drainage operation does not reach first power, perform control to increase a speed of the motor or the power consumed by the motor, and when the power consumed by the motor during the drainage operation reaches the first power and remains within a first range corresponding to the first power and then falls from the first range, output a drainage completion message.

The controller may be further configured to perform power control so that the power consumed by the motor during the drainage operation is within the first range, and, when the power consumed by the motor during the draining operation is out of the first range, determine the drainage as being completed and output the drainage completion message.

The controller may be further configured to, when the power consumed by the motor during the drainage operation is out of the first range while a water level frequency detected by the water level sensor is increased, determine the drainage as being completed and perform control to output the drainage completion message.

The controller may be configured to, when the power consumed by the motor during the drainage operation is reduced while a water level frequency detected by the water level sensor is increased, determine the drainage as being completed and perform control to output the drainage completion message.

The laundry treatment machine may further include an output current detector configured to detect an output current flowing in the motor, and the controller may be further configured to calculate power consumption of the motor based on the output current.

In accordance with another aspect of the present disclosure, there is provided a laundry treatment machine including a washing tub, a washing tub motor configured to rotate the washing tub, a water level sensor configured to sense a water level of the washing tub, a drain pump configured to operate to drain the washing tub, a motor configured to operate the drain pump, a converter configured to output DC power, an inverter configured to convert the DC power from the converter into AC power by a switching operation and output the converted AC power to the motor, an output current detector configured to an output current flowing in the motor, and a controller configured to determine whether drainage is completed based on a water level frequency from the water level sensor and the output current from the output current detector, and output a drainage completion message in response to completion of the drainage.

The controller may be further configured to, when the water level frequency from the water level sensor is equal to or greater than a first frequency and a level of the output current is equal to or less than a first level, determine the drainage as being completed and output the drainage completion message.

The controller may be configured to, when the output current is decreased while the water level frequency from the water level sensor is increased, determine that drainage as being completed and perform control to output the drainage completion message.

The output current detector may include a resistance element connected between the motor or the inverter and a grounding terminal.

In accordance with another aspect of the present disclosure, there is provided a laundry treatment machine including a washing tub, a washing tub motor configured to rotate the washing tub, a water level sensor configured to sense a water level of the washing tub, a drain pump configured to operate to drain the washing tub, a motor configured to operate the drain pump, a converter configured to output DC power, an inverter configured to convert the DC power from the converter into AC power by a switching operation and output the converted AC power to the motor, an output current detector configured to an output current flowing in the motor, and a controller configured to, when the power consumed by the motor during the drainage operation is reduced while a water level frequency detected by the water level sensor is increased, determine the drainage as being completed and perform control to output the drainage completion message.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
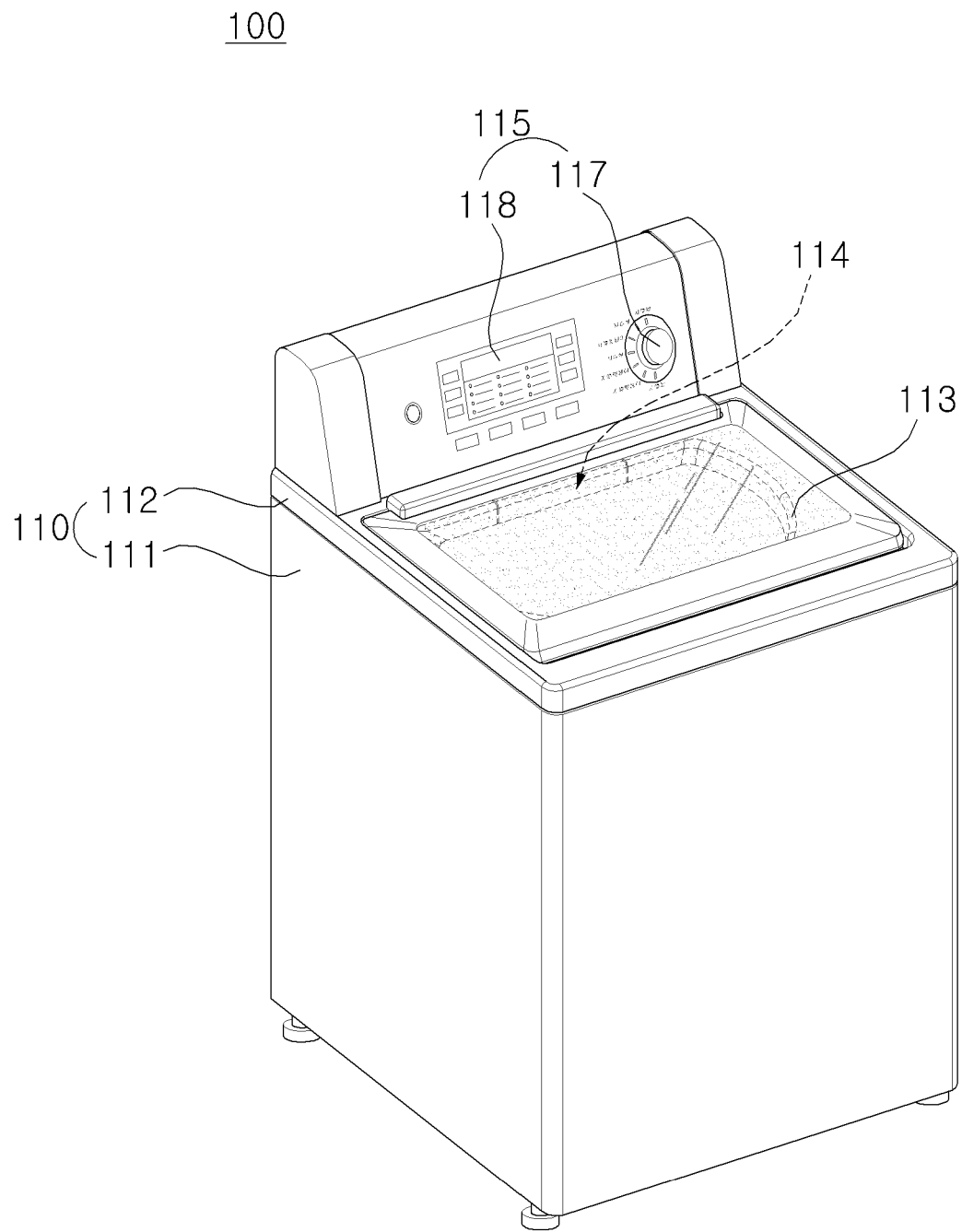
FIG. 1 is a perspective view illustrating a laundry treatment machine according to an embodiment of the present disclosure.
Figure 2:
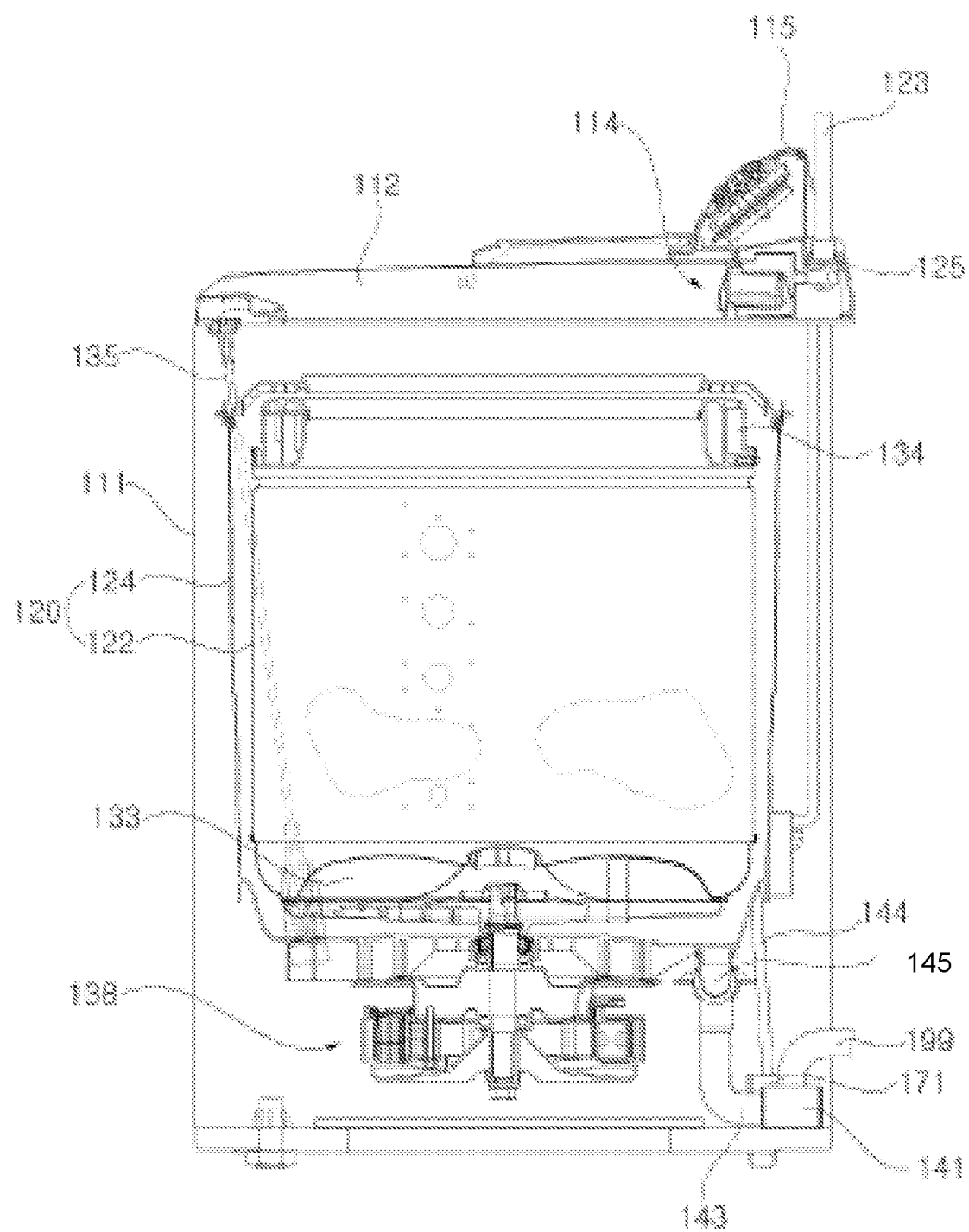
FIG. 2 is a side cross-sectional view of the laundry treatment machine of FIG. 1.

FIG. 1 is a perspective view illustrating a laundry treatment machine according to an embodiment of the present disclosure, and FIG. 2 is a side cross-sectional view illustrating the laundry treatment machine of FIG. 1.

Referring to FIGS. 1 and 2, the laundry treatment machine 100 according to an embodiment of the present disclosure conceptually includes a washing machine having fabric inserted therein for performing washing, rinsing and dewatering, or a dryer having wet fabric inserted therein. The washing machine will be mainly described below.

The washing machine 100 includes a casing 110 forming an outer appearance, operation keys for receiving various control commands from a user, and a control panel 115 equipped with a display for displaying information on the operating state of the washing machine 100 to provide a user interface, and a door 113 rotatably installed in the casing 110 to open and close an entrance hole through which the laundry enters and exits.

The casing 110 includes a body 111 for defining a space in which various components of the washing machine 100 can be accommodated and a top cover 112 provided at an upper side of the body 111 and forming a fabric entrance hole to allow the laundry to be introduced into an inner tub 122 therethrough.

The casing 110 is described as including the body 111 and the top cover 112, but the casing 110 is not limited thereto as long as it forms the appearance of the washing machine 100.

A support rod 135 is coupled to the top cover 112 which is one of the constituent elements of the casing 110. However, the support rod 135 is not limited thereto and may be coupled to any part of the fixed portion of the casing 110.

The control panel 115 includes operation keys 117 for controlling an operation state of the laundry treatment machine 100 and a display 118 (not shown) disposed on one side of the operation keys 117 to display the operation state of the laundry treatment machine 100.

The door 113 opens and closes a fabric entrance hole (not shown) formed in the top cover 112 and may include a transparent member such as reinforced glass to allow the inside of the body 111 to be seen.

The washing machine 100 may include a washing tub 120. The washing tub 120 may include an outer tub 124 containing wash water and an inner tub 122 rotatably installed in the outer tub 124 to accommodate laundry. A balancer 134 may be provided at the upper portion of the washing tub 120 to compensate for unbalance amount generated when the washing tub 120 rotates.

Meanwhile, the washing machine 100 may include a pulsator 133 rotatably provided at a lower portion of the washing tub 120.

The driving apparatus 138 serves to provide a driving force for rotating the inner tub 122 and/or the pulsator 133. A clutch (not shown) for selectively transmitting the driving force of the driving apparatus 138 may be provided such that only the inner tub 122 is rotated, only the pulsator 133 is rotated, or the inner tub 122 and the pulsator 133 are rotated at the same time.

Figure 3:
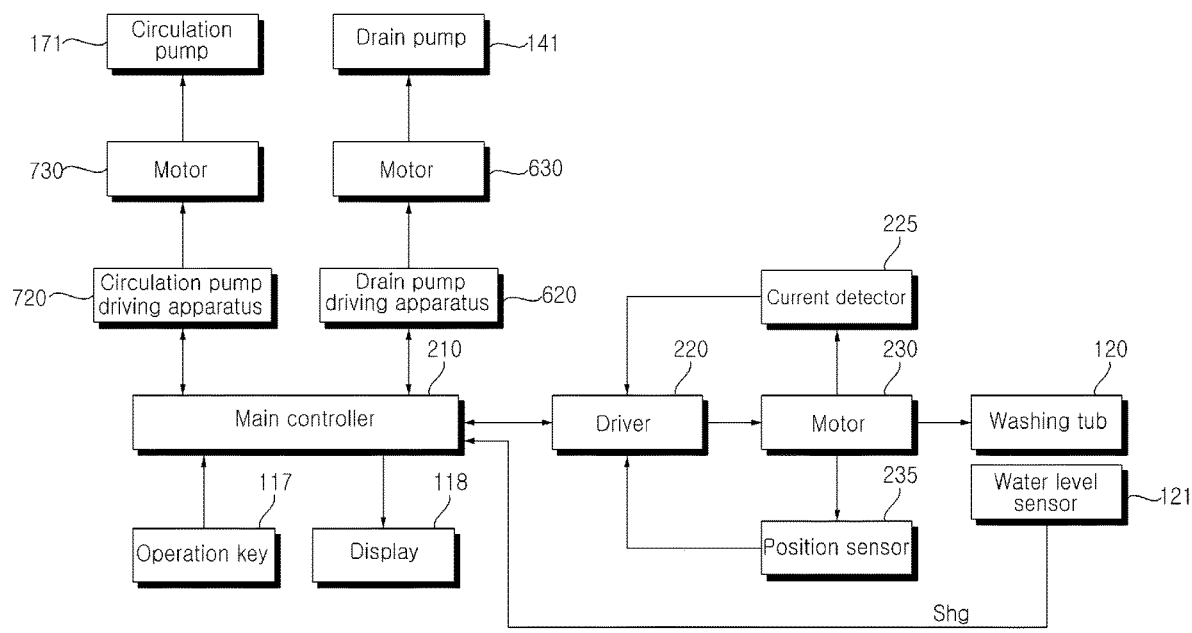
FIG. 3 is an internal block diagram of the laundry treatment machine of FIG. 1.

The driving apparatus 138 is operated by a driver 220 of FIG. 3, that is, a driving circuit. This will be described later with reference to FIG. 3 and other drawings.

A detergent box 114 for accommodating various additives such as a laundry detergent, a fabric softener, and/or a bleaching agent is retrievably provided to the top cover 112, and the wash water supplied through a water supply channel 123 flows into the inner tub 122 via the detergent box.

A plurality of holes (not shown) is formed in the inner tub 122. Thereby, the wash water supplied to the inner tub 122 flows to the outer tub 124 through the plurality of holes. A water supply valve 125 for regulating the water supply channel 123 may be provided.

The wash water is drained from the outer tub 124 through a drain channel 143. A drain valve 145 for regulating the drain channel 143 and a drain pump 141 for pumping the wash water may be provided.

In addition, a circulation pump 171 for pumping the washing water may be provided at an end of the drain channel 143. Washing water pumped from the circulation pump 171 may be introduced back into the washing tub 120 through the circulation passage 144.

The support rod 135 is provided to hang the outer tub 124 in the casing 110. One end of the support rod 135 is connected to the casing 110 and the other end of the support rod 135 is connected to the outer tub 124 by a suspension 150.

The suspension 150 attenuates vibration of the outer tub 124 during the operation of the washing machine 100. For example, the outer tub 124 may be vibrated by vibration generated as the inner tub 122 rotates. While the inner tub 122 rotates, the vibration caused by various factors such as unbalance laundry amount contained in the inner tub 122, the rotational speed of the inner tub 122 or the resonance characteristics of the inner tub 122 can be attenuated.

FIG. 3 is an internal block diagram of the laundry treatment machine of FIG. 1.

Referring to the drawing, in the laundry treatment machine 100, the driver 220 is controlled by a control operation of the main controller 210, and the driver 220 drives a washing tub motor 230. Accordingly, the washing tub 120 is rotated by the washing tub motor 230.

Meanwhile, the laundry treatment machine 100 may include a drain motor 630 for driving the drain pump 141 and a drain pump driving apparatus 620 for driving the drain motor 630. The drain pump driving apparatus 620 may be controlled by the main controller 210.

Meanwhile, the laundry treatment machine 100 may include a motor 730 for driving the circulation pump 171 and a circulation pump driving apparatus 720 for driving the motor 730. The circulation pump driving apparatus 720 may be controlled by the main controller 210.

In the present specification, the drain pump driving apparatus 620 may be referred to as a drain pump driver.

The main controller 210 receives an operation signal from an operation key 1017 to operate. Accordingly, washing, rinsing, and dehydration cycles may be performed.

In addition, the main controller 210 may control the display 118 to display a washing course, a washing time, a dehydration time, a rinsing time, or a current operation state.

Meanwhile, the main controller 210 controls the drive unit 220 to control the washing tub motor 230 to operate. For example, based on a current detector for detecting an output current flowing in the washing tub motor 230 and a position sensor 220 for detecting a position of the washing tub motor 230, the controller may control the driver 220 to rotate the washing tub motor 230. While the detected current and the sensed position signal are illustrated in FIG. 3 as being input to the driver 220, embodiments of the present invention are not limited thereto. The detected current and the sensed position signal may be applied to only the main controller 210 or to both the main controller 210 and the driver 220.

The driver 220 is for driving the washing tub motor 230 and may include an inverter (not shown) and an inverter controller (not shown). In addition, the driver 220 may be a concept that further includes a converter, which supplies a DC power input to an inverter (not shown).

For example, when the inverter controller (not shown) outputs a pulse width modulation (PWM) switching control signal to the inverter (not shown), the inverter (not shown) performs a high-speed switching operation to supply AC power of a predetermined frequency to the washing tub motor 230.

Meanwhile, the main controller 210 may detect a laundry amount based on a current io detected by the current detector 220 or a position signal H sensed by a position sensor 235. For example, while the washing tub 120 rotates, it is possible to detect the laundry amount based on the current value io of the washing tub motor 230.

Meanwhile, the main controller 210 may calculate the unbalance amount of the washing tub 120, that is, the unbalance (UB) of the washing tub 120. Such unbalance amount calculation may be performed based on the ripple component of the current io detected by the current detector 225 or the amount of change in a rotational speed of the washing tub 120.

Meanwhile, a water level sensor 121 may measure the water level in the washing tub 120.

For example, the water level frequency at the zero water level in which there is no water in the washing tub 120 may be 28 KHz, and the water level frequency at the full water level in which water reaches the allowable water level in the washing tub 120 may be 23 KHz.

That is, the water level frequency detected by the water level sensor 121 may be inversely proportional to the water level in the washing tub.

Meanwhile, a washing tub water level Shg output from the water level sensor 121 may be a water level inversely proportional to the water level frequency.

The main controller 210 may determine whether the washing tub 120 is at the full water level, an empty water level, a reset water level, or the like based on the washing tub water level Shg detected by the water level sensor 121.

Figure 4:
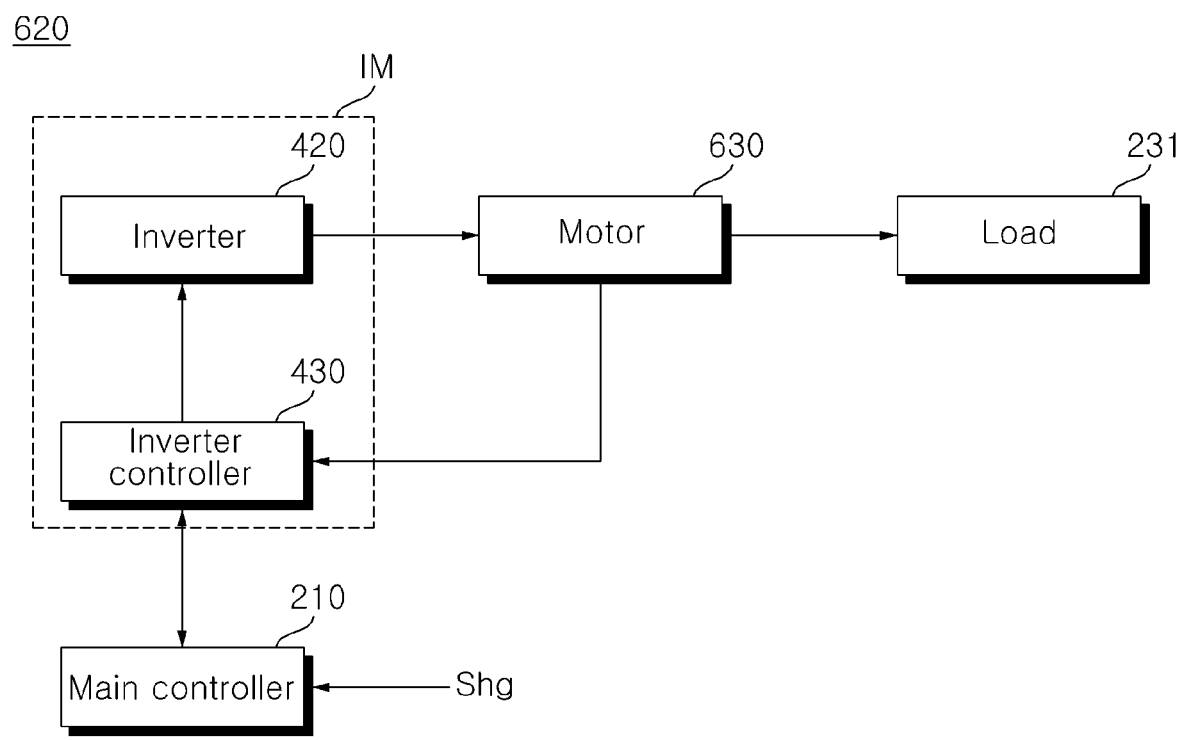
FIG. 4 illustrates an example of an internal block diagram of a drain pump driving apparatus of FIG. 1.
Figure 5:
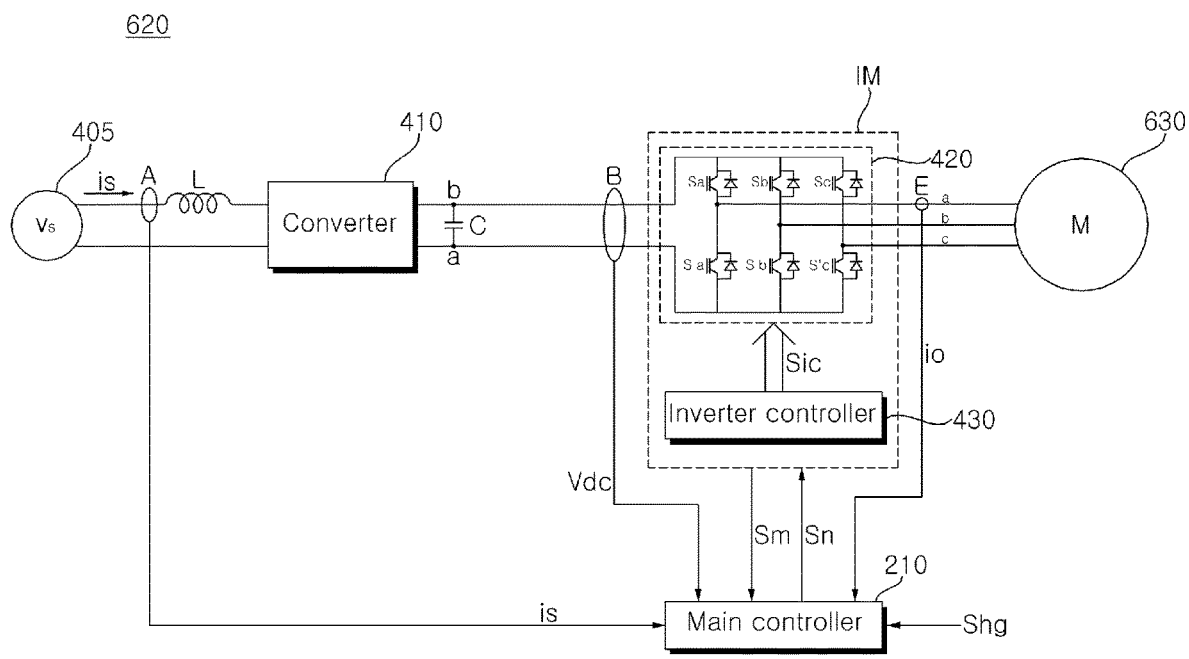
FIG. 5 is an example of an internal circuit diagram of the drain pump driving apparatus of FIG. 4.

FIG. 4 illustrates an example of an internal block diagram of the drain pump driving apparatus of FIG. 1, and FIG. 5 is an example of an internal circuit diagram of the drain pump driving apparatus of FIG. 4.

Referring to the drawings, the drain pump driving apparatus 620 according to the embodiment of the present disclosure is for driving the drain motor 630 having a load 231 in a sensorless manner, the inverter 420, the inverter controller 430, the main controller 210, and the like.

The main controller 210 and the inverter controller 430 may correspond to the controller and the second controller described herein, respectively.

In addition, the drain pump driving apparatus 620 according to the embodiment of the present disclosure may include a converter 410, a dc end voltage detector B, a dc terminal capacitor C, an output current detector E, and the like. In addition, the drain pump driving apparatus 620 may further include an input current detector A, a reactor L, and the like.

Hereinafter, the operation of each constituent unit in the drain pump driving apparatus 620 of FIGS. 4 and 5 will be described.

The reactor L is disposed between a commercial AC power source 405 and the converter 410, and performs a power factor correction operation or a boost operation. The reactor L may also function to limit the harmonic current resulting from high-speed switching of the converter 410.

The input current detector A may detect an input current that is input from the commercial AC power source 405. To this end, a current transformer (CT), a shunt resistor, or the like may be used as the input current detector A. The detected input current may be input to the inverter controller 430 or the main controller 210 as a discrete signal in the form of a pulse. In the drawing, it is illustrated that the detected output current io is input to the main controller 210.

The converter 410 converts the commercial AC power source 405 having passing through the reactor L into DC power, and outputs the DC power. Although the commercial AC power source 405 is shown as a single phase AC power source in the drawing, it may be a 3-phase AC power source. The internal structure of the converter 410 depends on the type of the commercial AC power source 405.

Meanwhile, the converter 410 may be configured with diodes or the like without a switching device, and may perform a rectification operation without a separate switching operation.

For example, in the case of a single-phase AC power source, four diodes may be used in the form of a bridge. In the case of a 3-phase AC power source, six diodes may be used in the form of a bridge.

As the converter 410, a half-bridge type converter having two switching devices and four diodes connected to each other may be used. In the case of a 3-phase AC power source, six switching devices and six diodes may be used for the converter.

The converter 410 may include a switched mode power supply (SMPS) including a switching device and a transformer.

Meanwhile, the converter 410 may also convert the level of the input DC power and output the DC power.

The dc terminal capacitor C smooths the input power and stores the smoothed input power. In the drawing, one device is exemplified as the dc terminal capacitor C, but a plurality of devices may be provided to ensure device stability.

While the dc terminal capacitor C is illustrated as being connected to an output terminal of the converter 410 in the drawing, aspects of the present disclosure are not limited thereto and the DC power may be input directly to the dc terminal capacitor C.

For example, DC power from a solar cell may be input directly to the dc terminal capacitor C or may be DC-to-DC converted and input to the dc terminal capacitor C. Hereinafter, the parts illustrated in the drawings will be mainly described.

Meanwhile, both ends of the dc terminal capacitor C are referred to as DC terminals or DC links because the DC power is stored.

The DC terminal voltage detector B may detect the DC terminal voltage Vdc between both ends of the dc terminal capacitor C. To this end, the DC terminal voltage detector B may include a resistance element and an amplifier. The detected DC terminal voltage Vdc may be input to the inverter controller 430 or the main controller 210 as a discrete signal in the form of a pulse. In the drawing, it is illustrated that the detected output current io is input to the main controller 210.

The inverter 420 may include a plurality of inverter switching devices, convert the smoothed DC power Vdc smoothed by the on/off operation of the switching device into AC power, and outputs the AC power to a synchronous motor 630.

For example, when the synchronous motor 630 is a 3-phase synchronous motor as shown in the drawing, the inverter 420 may convert the DC power supply Vdc into 3-phase AC power source va, vb, and vc, and output the 3-phase AC power source va, vb, and vc to the 3-phase synchronous motor 630.

In another example, when the synchronous motor 630 is a single-phase synchronous motor, the inverter 420 may convert the DC power supply Vdc into a single phase AC power and output the single phase AC power to the single phase synchronous motor 630.

The inverter 420 includes upper switching devices Sa, Sb and Sc and lower switching devices S'a, S'b and S'c. Each of the upper switching devices Sa, Sb, Sc and a corresponding lower switching device S'a, S'b, S'c are connected in series to form a pair. Three pairs of upper and lower switching devices Sa and S'a, Sb and S'b, and Sc and S'c are connected in parallel. Each of the switching devices Sa, S'a, Sb, S'b, Sc and S'c is connected with a diode in anti-parallel.

Each of the switching devices in the inverter 420 is turned on/off based on an inverter switching control signal Sic from the inverter controller 430. Thereby, AC power having a predetermined frequency is output to the 3-phase synchronous motor 630.

The inverter controller 430 may output the switching control signal Sic to the inverter 420.

In particular, the inverter controller 430 may output the switching control signal Sic to the inverter 420 based on a voltage command value Sn input from the main controller 210.

The inverter controller 430 may output voltage information Sm of the drain motor 630 to the main controller 210 based on the voltage command value Sn or the switching control signal Sic.

The inverter 420 and the inverter controller 430 may be configured as one inverter module IM, as shown in FIG. 4 or 5.

The main controller 210 may control the switching operation of the inverter 420 in a sensorless manner.

To this end, the main controller 210 may receive an output current io detected by the output current detector E and a dc terminal voltage Vdc detected by the dc terminal voltage detector B.

The main controller 210 may calculate power based on the output current io and the dc terminal voltage Vdc, and output the voltage command value Sn based on the calculated power.

In particular, the main controller 210 may perform power control for stable operation of the drain motor 630, and output a voltage command value Sn based on the power control. Accordingly, the inverter controller 430 may output the corresponding switching control signal Sic based on the voltage command value Sn that is based on the power control.

The output current detector E may detect the output current io flowing between the 3-phase drain motor 630.

The output current detector E may be disposed between the 3-phase drain motor 630 and the inverter 420 to detect the output current io flowing through the motor. In the drawing, it is illustrated that a phase current among phase currents ia, ib and ic, which are output currents io flowing through the drain motor 630, is detected.

Meanwhile, unlike the drawing, the output current detector E may be disposed between the dc terminal capacitor C and the inverter 420 to sequentially detect the output current flowing through the motor. In this case, one shunt resistor device Rs may be used, and the phase currents ia, ib, ic flowing through the drain motor 630 may be detected in a time division manner.

The detected output current io may be input to the inverter controller 430 or the main controller 210 as a discrete signal in the form of a pulse. In the drawing, it is illustrated that the detected output current io is input to the main controller 210.

Meanwhile, the 3-phase drain motor 630 includes a stator and a rotor, and AC power of each phase of a predetermined frequency is applied to the coils of the stators of the phases (a, b, and c phases), thereby causing the rotor to rotate.

Such a drain motor 630 may include a brushless DC (BLDC) motor.

For example, the drain motor 630 may include a Surface-Mounted Permanent-Magnet Synchronous Motor (SMPMSM), an Interior Permanent Magnet Synchronous Motor (IPMSM), and a Synchronous Reluctance Motor (SynRM). The SMPMSM and the IPMSM are Permanent Magnet Synchronous Motors (PMSM) employing permanent magnets, while the SynRM does not have a permanent magnet.

Figure 6:
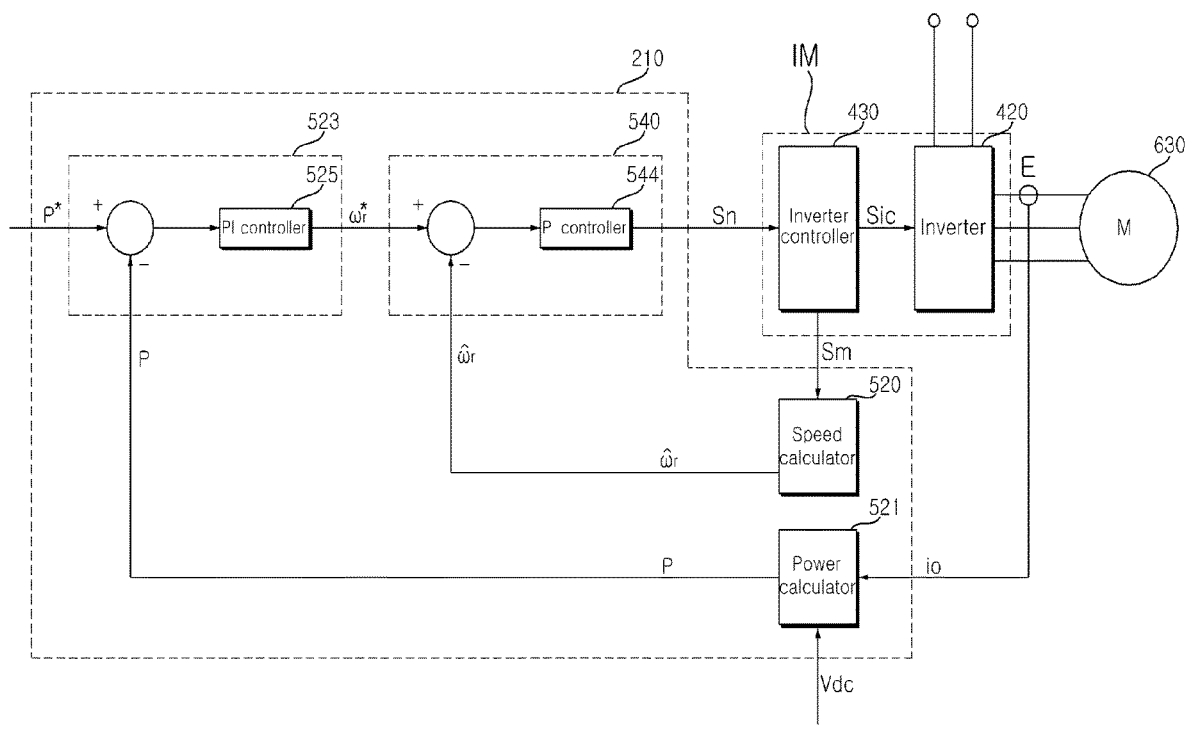
FIG. 6 is an internal block diagram of a main controller of FIG. 5.

FIG. 6 is an internal block diagram of a main controller of FIG. 5.

Referring to FIG. 6, the main controller 210 may include a speed calculator 520, a power calculator 521, a power controller 523, and a speed controller 540.

The speed calculator 520 may calculate a speed of the drain motor 630 based on the voltage information Sm of the drain motor 630 received from the inverter controller 430.

Specifically, the speed calculator 520 may calculates a zero crossing for the voltage information Sm of the drain motor 630 received from the inverter controller 430, and calculate the speed of the drain motor 630 based on the zero crossing.

The power calculator 521 may calculate power P to be supplied to the drain motor 630 based on the output current io detected by the output current detector E and the dc terminal voltage Vdc detected by the dc terminal voltage detector B.

The power controller 523 may generate a speed command value $\omega^*r$ based on the power P calculated by the power calculator 521 and a set power command value $P^*r$.

For example, the power controller 523 may perform PI control in a PI controller 525 based on a difference between the calculated power P and the power command value $P^*r$, and generate the speed command value $\omega^*r$.

Meanwhile, the speed controller 540 may generate a voltage command value Sn based on the speed calculated by the speed calculator 520 and the speed command value $\omega^*r$ generated by the power controller 523.

Specifically, the speed controller 540 may perform the PI control in the PI controller 544 based on the difference between the calculated speed and the speed command value $\omega^*r$, and generate the voltage command value Sn based on the PI control.

The generated voltage command value Sn may be output to the inverter controller 430.

The inverter controller 430 may receive the voltage command value Sn from the main controller 210 to generate and output an inverter switching control signal Sic according to a pulse width modulation PWM method.

The output inverter switching control signal Sic may be converted into a gate driving signal by a gate driver (not shown) and is then input to the gate of each switching device in the inverter 420. Thereby, the switching devices Sa, S'a, Sb, S'b, Sc, and S'c in the inverter 420 perform the switching operation. This enables stable power control.

Meanwhile, the main controller 210 according to the embodiment of the present disclosure may control, during the drainage, the power supplied to the drain motor 630 to be maintained at a constant level without decreasing over time. Thereby, the drainage time may be shortened.

Meanwhile, the main controller 210 according to an embodiment of the present disclosure may perform power control of the drain motor 630 when starting a drainage operation, and control to terminate the power control when reaching a residual water level. Thereby, the drainage operation may be performed efficiently.

Meanwhile, the main controller 210 according to the embodiment of the present disclosure may control the voltage command value Sn to increase as the level of the output current io decreases, so that the duty of the switching control signal Sic increases. Thereby, the drain motor 630 may be driven with a constant power.

Meanwhile, the drain motor 630 according to the embodiment of the present disclosure may implement a brushless DC motor 630 as the drain motor 630. Thereby, power control rather than constant speed control may be easily implemented.

Meanwhile, when the power supplied to the drain motor 630 does not reach first power during a drainage operation, the main controller 210 according to an embodiment of the present disclosure may control the speed of the drain motor 630 or the power consumption by the drain motor 630 to increase. When the power supplied to the drain motor 630 is out of the first power during the drainage operation, the main controller 210 may control the speed of the drain motor 630 to decrease.

Meanwhile, when the power supplied to the drain motor 630 reaches the first power, the main controller 210 according to the embodiment of the present disclosure may control the speed of the drain motor 630 to be constant.

As such, since the power control is performed and the drain motor 640 is driven at a constant power, the converter 410 needs to supply the constant power and thus the stability of the converter 410 may be improved. In addition, since power control is performed, it is possible to minimize the degradation in drainage performance according to an installation conditions.

In addition, the drain motor 630 may be driven stably, and further the drainage time may be shortened.

Figure 7:
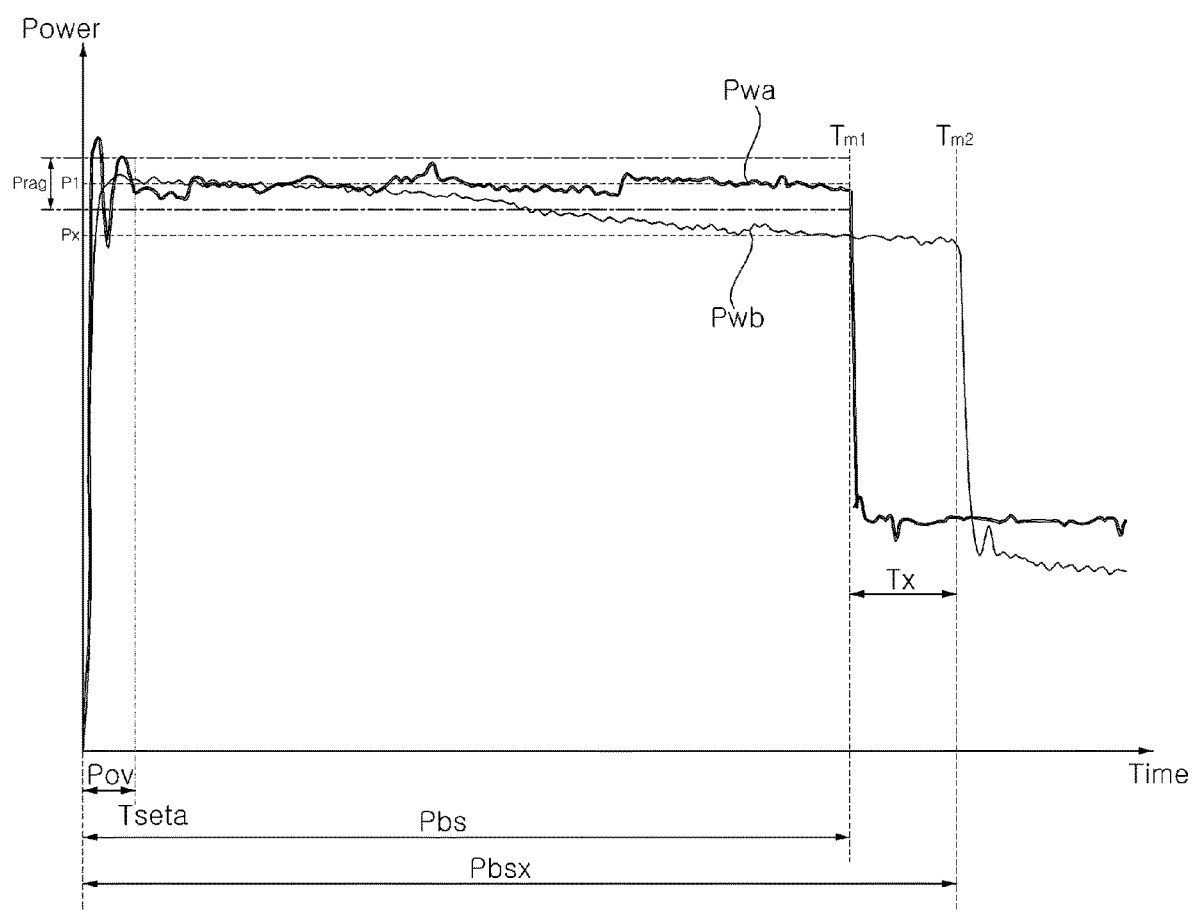
FIG. 7 is a diagram illustrating power supplied to a motor according to power control and speed control.

FIG. 7 is a diagram illustrating power supplied to a motor according to power control and speed control.

First, when power control is performed as in the embodiment of the present disclosure, a waveform of the power supplied to the drain motor 630 with time may be illustrated as Pwa.

In the drawing, it is illustrated that the power is maintained substantially constant according to the power control performed until the time Tm1 and that the power control is terminated at the time Tm1.

As the power control is performed during drainage, the main controller 210 may control the power supplied to the drain motor 630 to be constant without decreasing over time, even though the water level of the washing tub 120 is lowered.

As the power control is performed during drainage, the main controller 210 may control the power supplied to the drain motor 630 to be the first power P1.

In particular, even if a lift is varied, as the power control is performed during drainage, the main controller 210 may control the power supplied to the drain motor 630 to be a constant first power P1.

In this case, the constant first power P1 may mean that the drain motor 630 is driven with power within a first allowable range Prag on the basis of the first power P1. For example, being within the first allowable range Prag may correspond to the case of pulsating within about 10% of the first power P1.

FIG. 7 illustrates that, when the power control is performed, the drain motor 630 is driven with power within the first allowable range Prag based on the first power P1 from a Tseta time point to a drainage completion time point Tm1, except for the overshooting Pov period. Accordingly, even if a lift is varied during drainage, the pumping may be performed smoothly. In addition, the stability of the converter 410 may be improved.

Here, the first allowable range Prag may increase as the level of the first power P1 increases. In addition, the first allowable range Prag may increase as the drainage completion period Pbs becomes longer.

That is, when the lift is at a reference level Iref, the main controller 210 control the drain motor 630 to be driven with power within the first allowable range Prag on the basis of the first power P1 without decreasing over time from the first time point Tseta after the start of drainage to the drainage completion time of Tm1. When the lift is at a second level, from the first time Tseta to the completion of the drainage Tm1. In addition, the main controller 210 control the drain motor 630 to be driven with power within the first allowable range Prag on the basis of the first power P1 without decreasing over time from the first time Tseta to the drainage completion time Tm1.

To this end, when the power control is performed during draining, the main controller 210 may calculate power based on the output current io and the dc terminal voltage Vdc and output the voltage command value Sn based on the calculated power. The inverter controller 430 may output the switching control signal Sic to the drain motor 630 based on the voltage command value Sn.

Meanwhile, the main controller 210 may control the voltage command value Sn to increase as the level of the output current io decreases. The main controller 210 control the duty of the switching control signal Sic to increase as the level of the output current io decreases. Thereby, the drain motor 630 may be driven with a constant power.

The main controller 210 may control the power supplied to the drain motor 630 to rise rapidly during a Pov period in order to perform power control.

Meanwhile, the main controller 210 may control the power supplied to the drain motor 630 to rapidly descend from the time Tm1 at the end of the power control.

Next, unlike the embodiment of the present disclosure, when the speed control is performed, that is, when a constant speed of the drain motor 630 is controlled to be maintained, a waveform of the power supplied to the drain motor 630 over time may be exemplified as Pwb.

In the drawing, it is illustrated that the speed control is performed until the time Tm2 and that the speed control is terminated at the time Tm2.

According to the power waveform Pwb by the speed control, as the water level of the washing tub is lowered during drainage, the speed of the drain motor 630 may be constant, but the power supplied to the drain motor 630 may be sequentially lowered.

FIG. 7 illustrates an example in which the power supplied to the drain motor 630 is sequentially lowered during the speed control section Pbsx to reach approximately Px at Tm2 at the drainage completion time.

Accordingly, the end time of the operation of the drain motor 630 in the speed control may be Tm2, which is delayed by approximately the Tx period than in the power control.

As a result, according to the embodiment of the present disclosure, as the power control is performed, the drainage time in the drainage operation may be shortened by approximately Tx period, compared to the speed control. In addition, the power supplied from the converter 410 may be maintained constant, the operation stability of the converter 410 may be improved.

On the other hand, dehydration may be performed at each step of the washing cycle, rinsing, and dehydration cycle.

Meanwhile, dehydration may be performed during a washing cycle, during a rinsing cycle, during a dehydrating cycle. During the dehydration, drainage may be performed, and accordingly, the drain motor 630 may operate.

Meanwhile, for dehydration, the washing tub motor 230 for supplying a rotational force to the washing tub 120 may operate, and the drain motor 630 may operate for drainage.

Meanwhile, when the drainage completion determination during the drainage operation is made based on the water level sensor 121 for detecting the water level of the washing tub, it is difficult to make an accurate drainage determination.

Accordingly, when the drainage completion determination is made based on the water level sensor 121, it may be possible to basically set to drain for a specific time or more. In this case, there are drawbacks that it is difficult to accurately determine the completion of drainage and that a considerable time is required.

Accordingly, the present disclosure proposes a method for quickly and accurately determining the completion of the operation of the drain pump. This will be described with reference to FIG. 8 or below.

Figure 8:
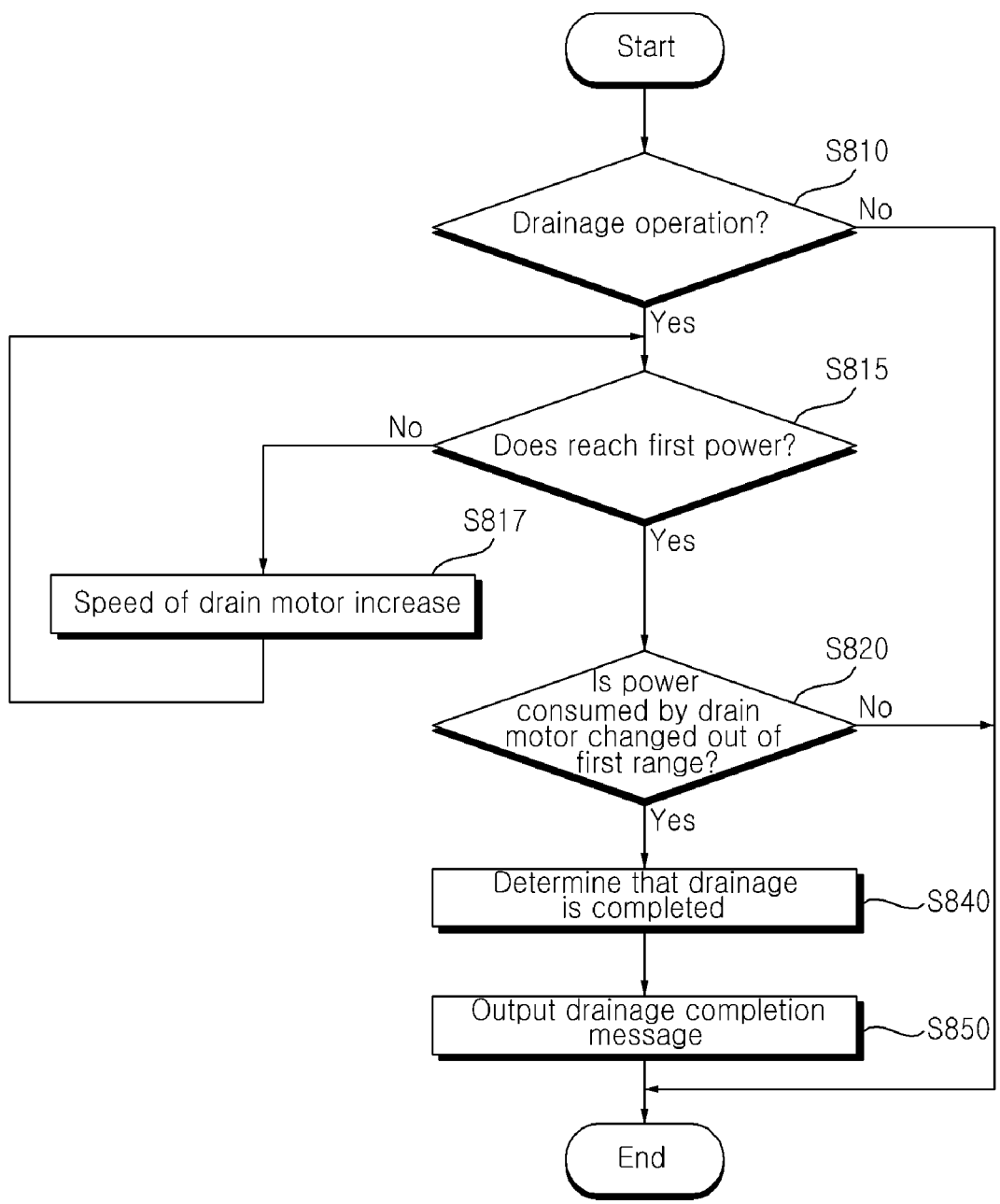
FIG. 8 is a flowchart illustrating a method for operating a laundry treatment machine according to an embodiment of the present disclosure.
Figure 9:
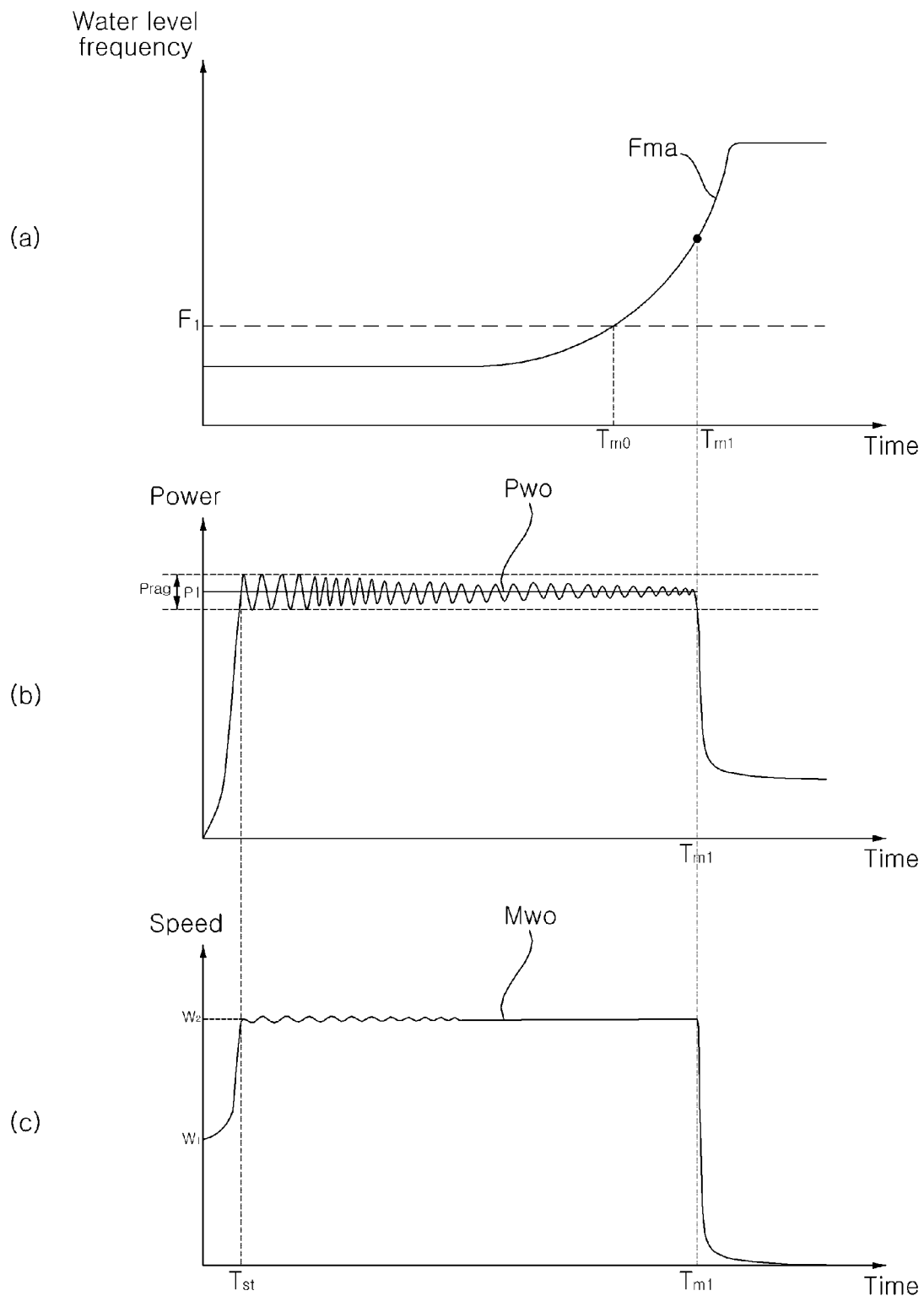
FIGS. 9 to 10 are views referred to for describing the operating method of FIG. 8.
Figure 10:
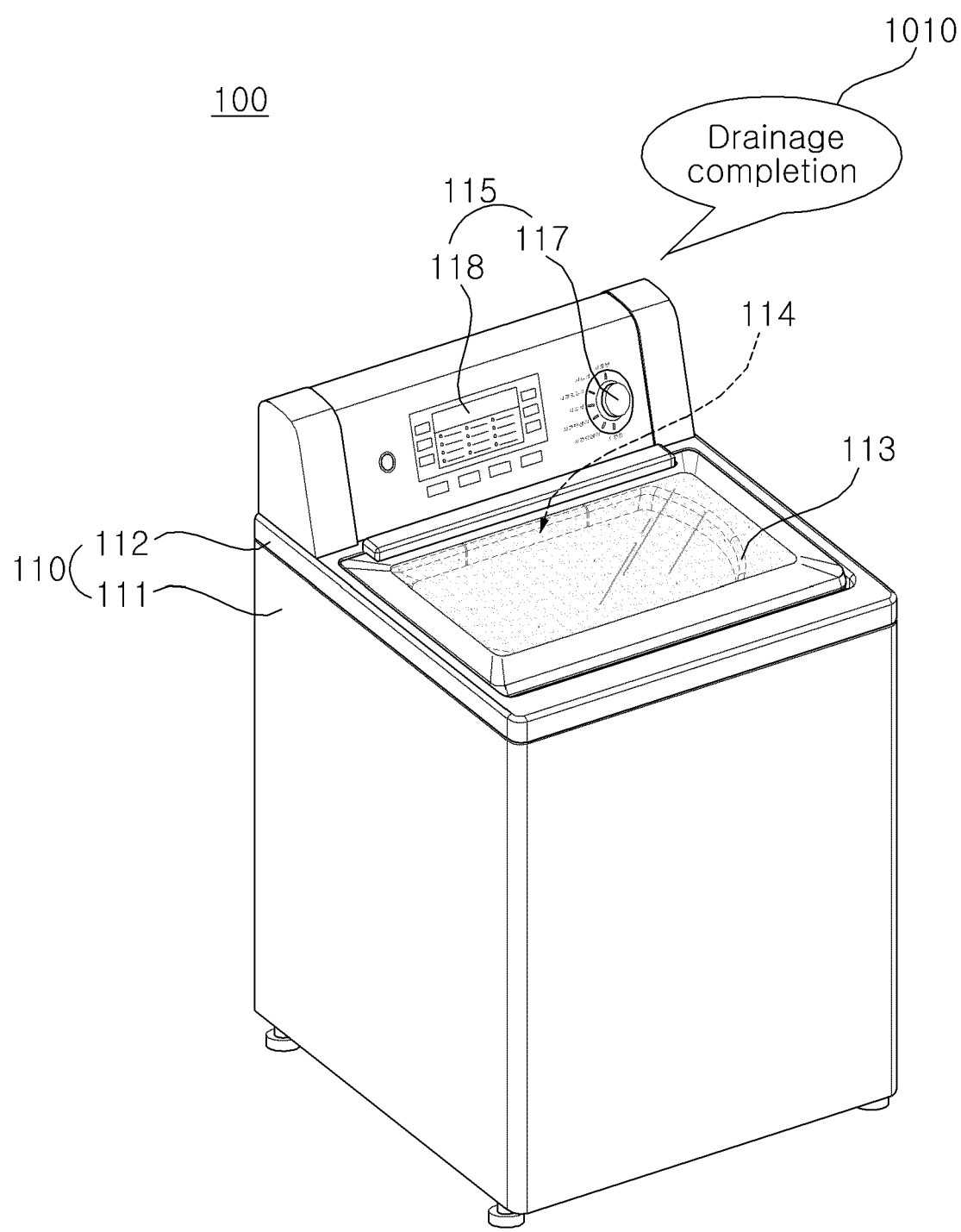

FIG. 8 is a flowchart illustrating a method of operating a laundry treatment machine according to an exemplary embodiment of the present disclosure, and FIGS. 9 to 10 are views referred to for describing the method of operation of FIG. 8.

Referring to the drawings, the main controller 210 may determine whether a drainage operation is being performed (S810). When the drainage operation is being performed, the main controller 210 may determine whether power consumed by the draining motor 630 reaches the first power P1 (S815).

Meanwhile, when the power consumed by the drain motor 630 does not reach the first power P1 during the drainage operation, the main controller 210 may perform control so that the power consumed by the drain motor 630 during the drainage operation reaches the first power P1.

To this end, when the power consumed by the drain motor 630 does not reach the first power P1 during the drainage operation, the main controller 210 may perform control so that the speed of the drain motor 630 increase or the power consumed by the drain motor 630 increase (S817).

Meanwhile, the main controller 210 may perform control so that the speed of the drain motor 630 increases until the power consumed by the drain motor 630 reaches the first power P1 during the drainage operation, or may perform control so that the power consumed by the drain motor 630 increases.

Meanwhile, the main controller 210 may determine whether the power consumed by the drain motor 630 during the drainage operation reaches the first power P1 and then remains within the first range Pavg corresponding to the first power or is changed out of the first range Pavg (S820).

Meanwhile, if the power consumed by the drain motor 630 during the drainage operation falls from the first range Pavg, the main controller 210 may determine that the drainage is completed (S840). Then, the main controller 210 may perform control to output a drainage completion message (S850).

As described in the description of FIG. 7, the main controller 210 may perform power control so as to protect the converter 410, shorten the drainage time, and the like.

That is, the main controller 210 may perform control so that the power consumed by the drain motor 630 during the drainage operation falls within the first range Pavg.

FIG. 9A illustrates a water level frequency waveform Fma detected by the water level sensor 121 during drainage, FIG. 9B illustrates a waveform Pwo of power consumed by the drain motor 630, and FIG. 9C illustrates a speed waveform Mwo of the drain motor 630.

When the drainage operation is started, the main controller 210 may perform control to increase the speed of the drain motor 630 or the power consumed by the drain motor 630 so that the power consumed by the drain motor 630 reaches the first power P1 by power control.

Before a time Tst in FIG. 9B, the power consumed by the drain motor 630 may be increased by the power control. At a time Tst in FIG. 9B, the power consumed by the drain motor 630 may reach the first power P1.

Before a Tst time point in FIG. 9C, the speed of the drain motor 630 be continuously increased by the power control from W1 to W2. At a time Tst in FIG. 9C, the speed of the drain motor 630 may reach W2.

When the power consumed by the drain motor 630 reaches the first power P1 by the power control during the drainage operation, the main controller 210 may perform control to maintain the first range Pavg corresponding to the first power.

Accordingly, before the time Tm1 in FIG. 9B, the power consumed by the drain motor 630 may be maintained by the power control within the first range Pavg based on the first power P1.

Meanwhile, when the power consumed by the drain motor 630 during the drainage operation falls from the first range, that is, after the time Tm1 in FIG. 10, the main controller 210 may determine the drainage as being completed. Then, the main controller 210 may perform control to output a drainage completion message 1010 through audio or through a display, as shown in FIG. 10. Accordingly, it is possible to quickly and accurately determine the completion of the operation of the drain pump.

When determining the completion of drainage, the main controller 210 may stop the operation of the inverter 420 or the like so that the operation of the drain motor 630 is stopped eventually. As a result, the drainage time may be shortened and power waste may be reduced.

Meanwhile, the main controller 210 may control to maintain the power consumed by the drain motor 630 during the drainage operation within the first range by the power control. When the power consumed by the drain motor 630 during the drainage operation is out of the first range, the main controller 210 may determine the completion of the drainage and then output a drainage completion message. Accordingly, it is possible to quickly and accurately determine the completion of the operation of the drain pump. Therefore, it is possible to shorten the drainage time and reduce the waste of power.

Based on a water level frequency detected by the water level sensor 121 and the power consumed by the drain motor 630 during the drainage operation, the main controller 210 may determine the drainage as being completed. Then, the main controller 210 may perform control to output a drainage completion message.

For example, when the water level frequency detected by the water level sensor 121 is increased as shown in FIG. 9 (*a*) and the power consumed by the drain motor 630 during the drainage operation falls from the first range, the main controller 210 may determine the drainage as being completed and perform control to output the drainage completion message. Accordingly, it is possible to quickly and accurately determine the completion of the operation of the drain pump. Therefore, it is possible to shorten the drainage time and reduce the waste of power.

As another example, when the water level frequency detected by the water level sensor 121 is equal to or greater than the first frequency F1, as shown in FIG. 9 (*a*), and consumed by the drain motor 630 during the drainage operation When the power to be lowered out of the first range is determined to be a drainage completion, the main controller 210, it may be controlled to output a drainage completion message. Accordingly, it is possible to quickly and accurately determine the completion of the operation of the drain pump. Therefore, it is possible to shorten the drainage time and reduce the waste of power.

In another example, when the power consumed by the drain motor 630 during the drainage operation is reduced while the water level frequency detected by the water level sensor 121 is increased, the main controller 210 may determine the drainage as being completed and perform control to output a drainage completion message. Accordingly, it is possible to quickly and accurately determine the completion of the operation of the drain pump. Therefore, it is possible to shorten the drainage time and reduce the waste of power.

The main controller 210 may calculate the power consumed by the drain motor 630 based on the output current io detected by the output current detector E. Accordingly, the drain pump drain motor 630 may be driven in a sensorless manner.

Figure 11:
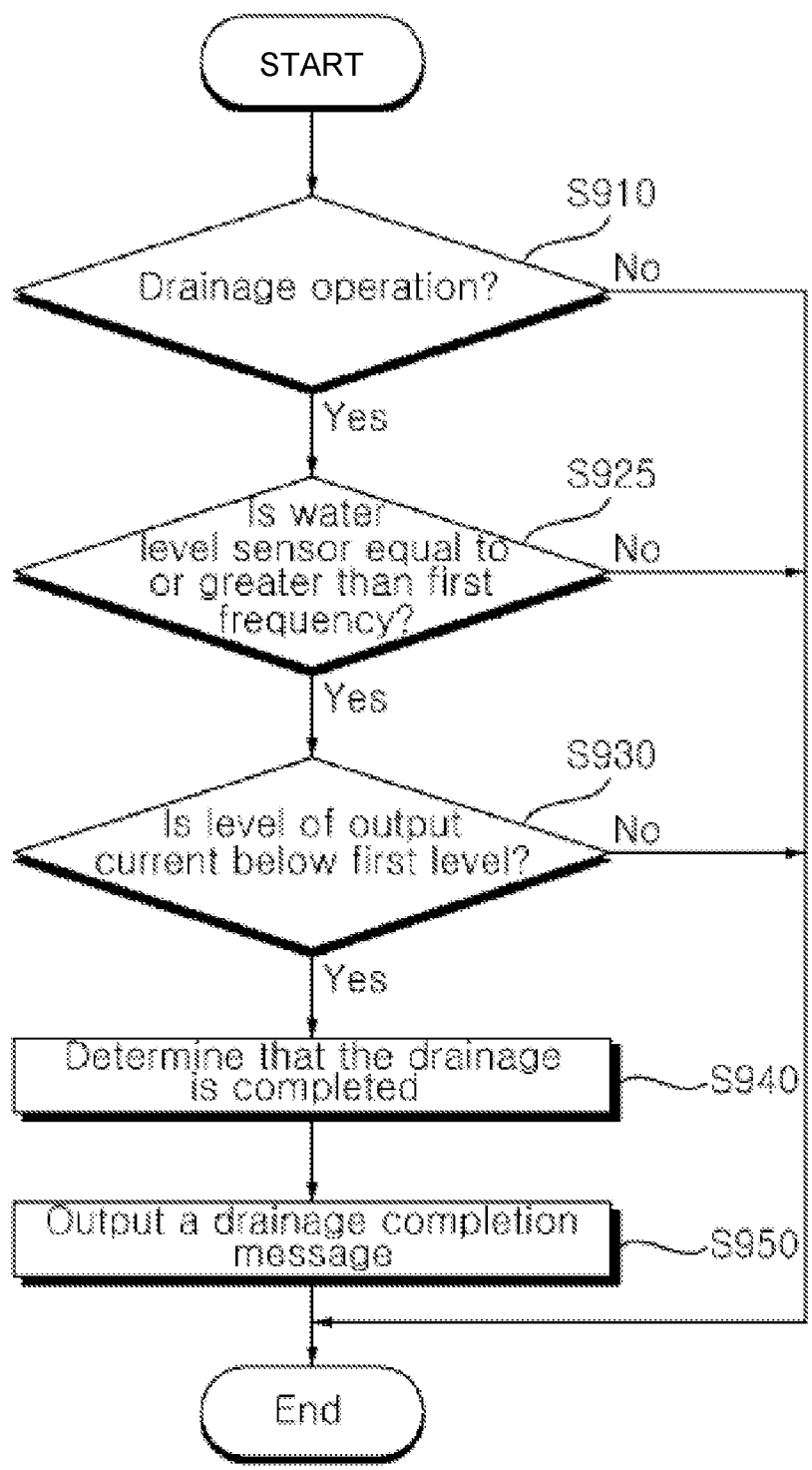
FIG. 11 is a flowchart illustrating a method for operating a laundry treatment machine according to an embodiment of the present disclosure.
Figure 12:
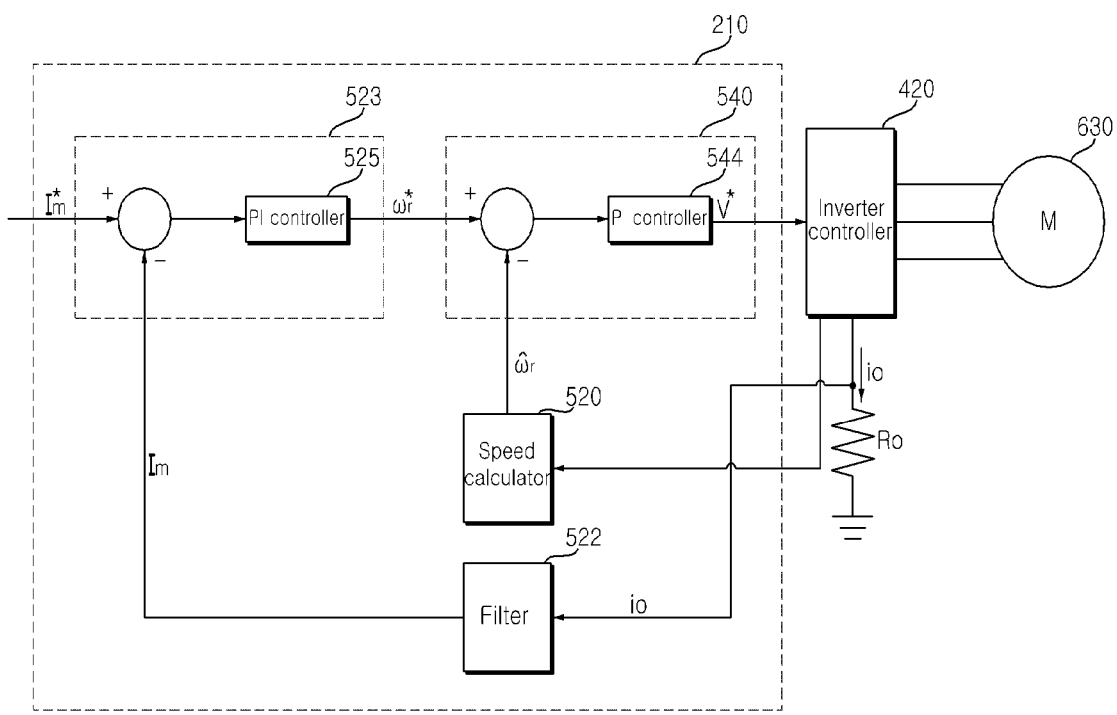
FIGS. 12 to 13 are views referred to for describing the operating method of FIG. 11.
Figure 13:
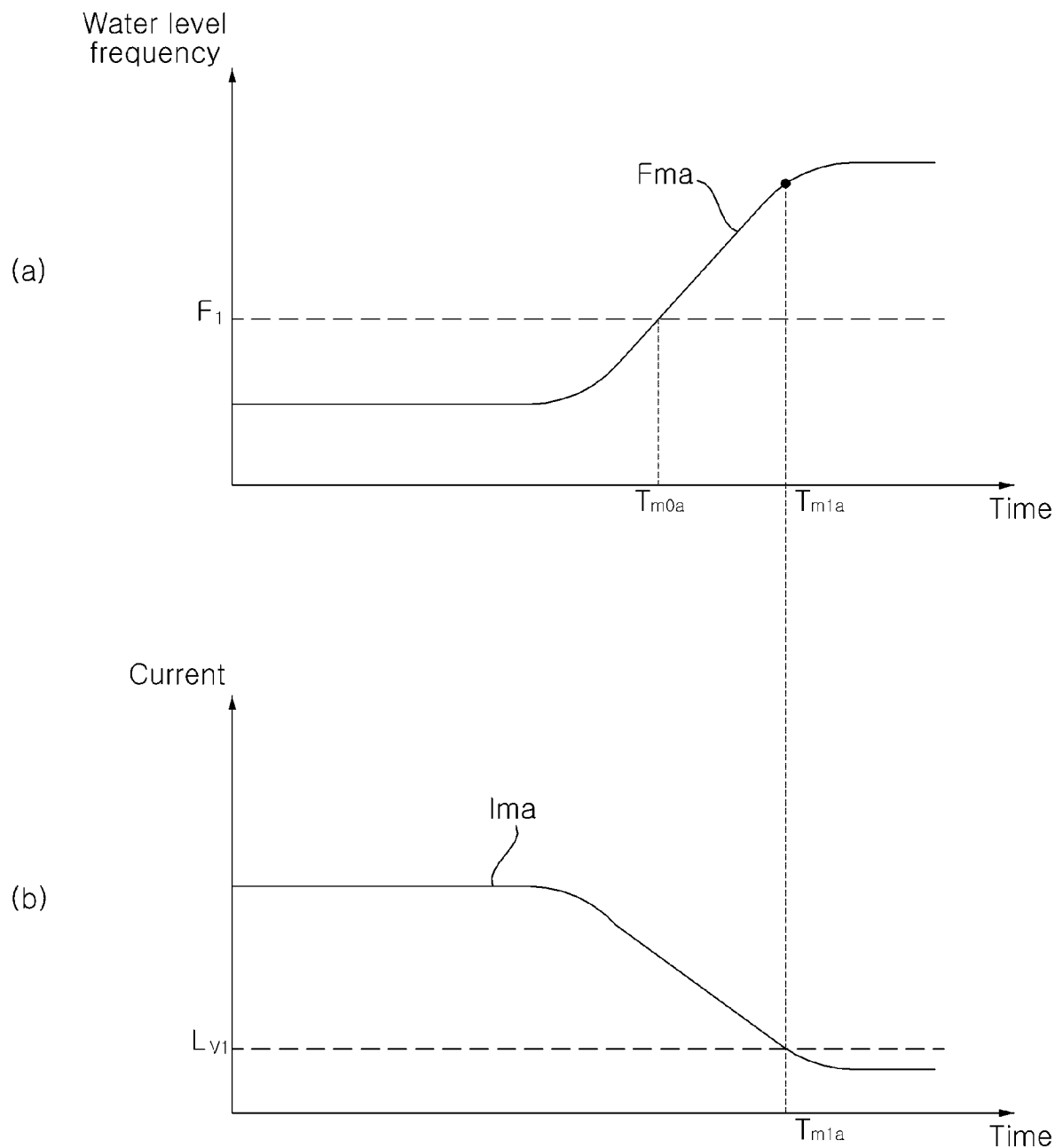

FIG. 11 is a flowchart illustrating a method of operating a laundry treatment machine according to an exemplary embodiment of the present disclosure, and FIGS. 12 to 13 are views referred to for describing the method of operation of FIG. 11.

Referring to the drawing, the main controller 210 may determine whether drainage is being performed (S910). In the case of the draining operation, the main controller 210 may determine whether a water level frequency detected by the water level sensor 121 is equal to or greater than the first frequency. (S925).

When the water level frequency detected by the water level sensor 121 is gradually increased, the water level in the washing tub 120 is gradually lowered.

Accordingly, the main controller 210 may determine whether the water level in the washing tub 120 is considerably lowered and the water level frequency is equal to or greater than the first frequency corresponding to a reference water level or a zero water level.

Meanwhile, the main controller 210 may determine whether the level of the output current decreases below the first level in a state where the water level frequency detected by the water level sensor 121 is equal to or greater than the first frequency (S930).

When the level of the output current is equal to or less than the first level, the main controller 210 may determine the drainage as being completed (S940) and perform control to output a drainage completion message (S950).

As described in the description of FIG. 7, the main controller 210 may perform power control so as to protect the converter 410, shorten the drainage time, and the like.

FIG. 13A illustrates a water level frequency waveform Fma detected by the water level sensor 121 during drainage, and FIG. 13B illustrates an output current waveform Ima detected by the output current detector E.

When the drainage is smoothly performed, the output current flowing through the drain motor 630 may remain at a high level. However, when the drainage is substantially in the last stage, the output current flowing through the drain motor 630 may be decreased as shown in FIG. 13 (b).

When the output current level detected by the output current detector E during the drainage operation is decreased to be equal to or less than the first level (Lv1), that is, after a time Tm1a in FIG. 13 (b), the main controller 210 may determine the drainage as being completed. Then, the main controller 210 may perform control to output the drainage completion message 1010 through audio or through a display, as shown in FIG. 10. Accordingly, it is possible to quickly and accurately determine the completion of the operation of the drain pump.

When determining the completion of drainage, the main controller 210 may stop the operation of the inverter 420 or the like so that the operation of the drain motor 630 is stopped eventually. As a result, the drainage time may be shortened and power waste may be reduced.

Based on the water level frequency from the water level sensor 121 and the output current io from the output current detector E, the main controller 210 may determine whether or not the drainage is completed. Then, when it is determined that the drainage is completed, the main controller 210 may output a drainage completion message. Accordingly, it is possible to quickly and accurately determine the completion of the operation of the drain pump. Therefore, it is possible to shorten the drainage time and reduce the waste of power.

The drain pump drain motor 630 may be driven in a sensorless manner, and thus, it is possible to improve the stability of the converter 410 and shorten the drainage completion period.

When the water level frequency detected by the water level sensor 121 is equal to or greater than the first frequency F1, as shown in FIG. 13 (a), and when the level of the output current io is equal to or less than the first level Lv1, as shown in FIG. 13 (b), the main controller 210 may determine the drainage as being completed and perform control to output a drainage completion message. Accordingly, it is possible to quickly and accurately determine the completion of the operation of the drain pump. Therefore, it is possible to shorten the drainage time and reduce the waste of power.

When the output current io is decreased, as shown in FIG. 13 (b), while the water level frequency detected by the water level sensor 121 is increased, as shown in FIG. 13 (a), the main controller 210 may determine the drainage as being completed and perform control to output a drainage completion message. Accordingly, it is possible to quickly and accurately determine the completion of the operation of the drain pump. Therefore, it is possible to shorten the drainage time and reduce the waste of power.

The output current detector E may include a resistance element connected between the drain motor 630 and a grounding terminal or between the inverter 420 and a grounding terminal, as shown in FIG. 12.

FIG. 12 illustrates another example of an internal block diagram of the main controller of FIG. 5.

Referring to the drawing, the main controller 210 may include a filter 522, a speed calculator 520, a current controller 523a, and a speed controller 540.

The filter 522 may filter the output current io detected by the output current detector E, and output the filtered current Im to the current controller 523a or the like.

The speed calculator 520 may calculate a speed of the drain motor 630 based on the output current io detected by the output current detector E.

Specifically, the speed calculator 520 may calculate a zero crossing for the output current io detected by the output current detecting unit E and calculate the speed of the drain motor 630 based on the zero crossing.

The current controller 523a may generate a speed command value $\omega^*r$ based on the current Im filtered by the filter unit 522 and a set current command value I*m.

For example, the current controller 523a may perform PI control in a PI controller 525 based on a difference between the filtered current Im and the set current command value I*m, and generate the speed command value $\omega^*r$.

Meanwhile, the speed controller 540 may generate a voltage command value Sn based on the speed calculated by the speed calculator 520 and the speed command value $\omega^*r$ generated by the power controller 523.

Specifically, the speed controller 540 may perform the PI control in the PI controller 544 based on the difference between an operational speed and the speed command value $\omega^*r$, and generate the voltage command value V* based on the PI control.

An inverter switching control signal Sic according to a pulse width modulation PWM method based on the generated voltage command value V* may be output to the inverter 420, thereby driving the inverter 420.

While FIG. 1 illustrates a top loading type machine as a laundry treatment machine, the drain pump driving apparatus 620 according to an embodiment of the present invention may also be applied to a front-loading washing machine, that is, a drum type washing machine.

Meanwhile, the driving apparatus 620 of the drain pump according to the embodiment of the present disclosure may be applied not just to the laundry treatment machine 100 but to various devices including a washing machine and an air conditioner.

The drain pump driving apparatus and the laundry treatment machine having the same according to embodiments of the present invention are not limited to the configuration and method of the embodiments described above. Variations may be made to the embodiments described above by selectively combining all or some of the embodiments.

A method for operating the drain pump driving apparatus and the laundry treatment machine of the present invention is implementable by code readable a processor provided to each of the drain pump driving apparatus, on a recording medium readable by the processor. The recording medium readable by the processor includes all kinds of recording devices for storing data which can be read by the processor.

A laundry treatment machine according to an embodiment of the present disclosure includes a washing tub, a washing tub motor configured to rotate the washing tub, a water level sensor configured to sense a water level of the washing tub, a drain pump configured to operate to drain the washing tub, a motor configured to operate the drain pump, a converter configured to output DC power, an inverter configured to convert the DC power from the converter into AC power by a switching operation and output the converted AC power to the motor, and a controller configured to, when power consumed by the motor during a drainage operation does not reach first power, perform control to increase a speed of the motor or the power consumed by the motor, and when the power consumed by the motor during the drainage operation reaches the first power and remains within a first range corresponding to the first power and then falls from the first range, output a drainage completion message. Accordingly, it is possible to quickly and accurately determine the completion of the operation of the drain pump. Therefore, it is possible to shorten the drainage time and reduce the waste of power.

The drain pump motor may be driven in a sensorless manner, and thus, it is possible to improve the stability of the converter and shorten the drainage completion period.

The controller of the laundry treatment machine according to an embodiment of the present disclosure may perform control by the power control, controls the power consumed by the motor during the drainage operation to be within the first range, the power consumed by the motor during the drainage operation, If it is out of the first range, it is determined that the drainage is completed, and may be controlled to output a drainage completion message. Accordingly, it is possible to quickly and accurately determine the completion of the operation of the drain pump. Therefore, it is possible to shorten the drainage time and reduce the waste of power.

When the power consumed by the motor during the drainage operation is out of the first range while the water level frequency detected by the water level sensor is increased, the controller of the laundry treatment machine according to an embodiment of the present disclosure may determine the drainage as being completed and perform control to output a drainage completion message. Accordingly, it is possible to quickly and accurately determine the completion of the operation of the drain pump. Therefore, it is possible to shorten the drainage time and reduce the waste of power.

When the power consumed by the motor during the drainage operation is decreased while the water level frequency detected by the water level sensor is increased, the controller of the laundry treatment machine according to an embodiment of the present disclosure may determine the drainage as being completed and perform control to output the drainage completion message. Accordingly, it is possible to quickly and accurately determine the completion of the operation of the drain pump. Therefore, it is possible to shorten the drainage time and reduce the waste of power.

The laundry treatment machine according to an embodiment of the present disclosure may further include an output current detector configured to detect an output current flowing in the motor, and the controller may be further configured to calculate, based on the output current, calculate the power consumed by the motor. Thereby, the drain pump motor may be driven in a sensorless manner.

A laundry treatment machine according to another embodiment of the present disclosure includes a washing tub, a washing tub motor configured to rotate the washing tub, a water level sensor configured to sense a water level of the washing tub, a drain pump configured to operate to drain the washing tub, a motor configured to operate the drain pump, a converter configured to output DC power, an inverter configured to convert the DC power from the converter into AC power by a switching operation and output the converted AC power to the motor, an output current detector configured to an output current flowing in the motor, and a controller configured to determine whether drainage is completed based on a water level frequency from the water level sensor and the output current from the output current detector, and output a drainage completion message in response to completion of the drainage. Accordingly, it is possible to quickly and accurately determine the completion of the operation of the drain pump. Therefore, it is possible to shorten the drainage time and reduce the waste of power.

The drain pump motor may be driven in a sensorless manner, and thus, it is possible to improve the stability of the converter and shorten the drainage completion period.

When the water level frequency from the water level sensor is equal to or greater than the first frequency and the level of the output current is equal to or less than the first level, the controller of the laundry treatment machine according to the embodiment of the present disclosure may determines the drainage as being completed and perform control to output the drainage completion message. Accordingly, it is possible to quickly and accurately determine the completion of the operation of the drain pump. Therefore, it is possible to shorten the drainage time and reduce the waste of power.

On the other hand, the controller of the laundry treatment machine according to an embodiment of the present disclosure, when the output current is lowered while the water level frequency from the water level sensor rises, it is determined that the drainage is completed, and may control to output a drainage completion message. Accordingly, it is possible to quickly and accurately determine the completion of the operation of the drain pump. Therefore, it is possible to shorten the drainage time and reduce the waste of power.

The output current detector of the laundry treatment machine according to an embodiment of the present disclosure may include a resistance element connected between the motor or inverter and the grounding terminal. Thereby, the drain pump motor may be driven in a sensorless manner.

A laundry treatment machine according to another embodiment of the present disclosure includes a washing tub, a washing tub motor configured to rotate the washing tub, a water level sensor configured to sense a water level of the washing tub, a drain pump configured to operate to drain the washing tub, a motor configured to operate the drain pump, a converter configured to output DC power, an inverter configured to convert the DC power from the converter into AC power by a switching operation and output the converted AC power to the motor, an output current detector configured to an output current flowing in the motor, and a controller configured to, when the power consumed by the motor during the drainage operation is reduced while a water level frequency detected by the water level sensor is increased, determine the drainage as being completed and perform control to output the drainage completion message. Accordingly, it is possible to quickly and accurately determine the completion of the operation of the drain pump. Therefore, it is possible to shorten the drainage time and reduce the waste of power.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A laundry treatment machine, comprising:
a washing tub;
a washing tub motor configured to rotate the washing tub;
a water level sensor configured to sense a water level of the washing tub;
a drain pump configured to operate to drain the washing tub;
a motor configured to operate the drain pump;
a converter configured to output DC power;
an inverter configured to convert the DC power from the converter into AC power by a switching operation and output the converted AC power to the motor; and
a controller configured to, when a power supplied to the motor during a drainage operation does not reach a first power, increase a speed of the motor or a power consumed by the motor, when the power supplied to the motor exceeds the first power, decrease the speed of the motor, and when the power supplied to motor reaches the first power and remains within a first range corresponding to the first power and then falls from the first range, output a drainage completion message,
wherein while the power consumed by the motor remains within the first range, a water level frequency sensed by the water level sensor is constant and then increases, and during the increase in the water level frequency, when the power consumed by the motor falls from the first range, the controller is configured to output the drainage completion message.

2. The laundry treatment machine of claim 1, wherein the controller is further configured to:
perform power control so that the power consumed by the motor during the drainage operation is within the first range; and
when the power consumed by the motor during the draining operation is out of the first range, determine the drainage operation as being completed and output the drainage completion message.

3. The laundry treatment machine of claim 1, wherein the controller is further configured to:
when the power consumed by the motor during the drainage operation is out of the first range while the water level frequency detected by the water level sensor is increased, determine the drainage as being completed and perform control to output the drainage completion message.

4. The laundry treatment machine of claim 1, wherein the controller is further configured to:
when the power consumed by the motor during the drainage operation is reduced while the water level frequency detected by the water level sensor is increased, determine the drainage as being completed and perform control to output the drainage completion message.

5. The laundry treatment machine of claim 1, further comprising an output current detector configured to detect an output current flowing in the motor,
the controller is further configured to calculate the power consumed by the motor based on the output current.

6. A laundry treatment machine, comprising:
a washing tub;
a washing tub motor configured to rotate the washing tub;
a water level sensor configured to sense a water level of the washing tub;
a drain pump configured to operate to drain the washing tub;
a motor configured to operate the drain pump;
a converter configured to output DC power;
an inverter configured to convert the DC power from the converter into AC power by a switching operation and output the converted AC power to the motor;
an output current detector configured to detect an output current flowing in the motor; and
a controller configured to determine whether drainage is completed based on a water level frequency from the water level sensor and the output current from the output current detector, and output a drainage completion message in response to completion of the drainage,
wherein the controller is configured to:
When a power supplied to the motor during a drainage operation does not reach a first power, increase a speed of the motor or a power consumed by the motor,
when the power supplied to the motor exceeds the first power, decrease the of the motor, and
while the power consumed by the motor remains within a first range corresponding to the first power, the water level frequency sensed by the water level sensor is constant and then increases, and as the water level frequency increased, when the power consumed by the motor falls from the first range, output the drainage completion message.

7. The laundry treatment machine of claim 6, wherein the controller is further configured to:
when the water level frequency from the water level sensor is equal to or greater than a first frequency and a level of the output current is equal to or less than a first level, determine the drainage as being completed and output the drainage completion message.

8. The laundry treatment machine of claim 6, wherein the controller is further configured to:
when the output current is decreased while the water level frequency from the water level sensor is increased, determine that drainage as being completed and perform control to output the drainage completion message.

9. The laundry treatment machine of claim 6, wherein the output current detector comprises a resistance element connected between the motor or the inverter and a grounding terminal.

10. The laundry treatment machine of claim 6, wherein the controller is further configured to:
perform power control so that the power consumed by the motor during the drainage operation is within the first range; and
when the power consumed by the motor during the draining operation is out of the first range, determine the drainage operation as being completed and output the drainage completion message.

11. The laundry treatment machine of claim 10, wherein the controller is further configured to:
when the power consumed by the motor during the drainage operation is out of the first range while the water level frequency detected by the water level sensor is increased, determine the drainage as being completed and perform control to output the drainage completion message.

12. The laundry treatment machine of claim 10, wherein the controller is further configured to:

when the power consumed by the motor during the drainage operation is reduced while the water level frequency detected by the water level sensor is increased, determine the drainage as being completed and perform control to output the drainage completion message.

13. The laundry treatment machine of claim 10, the controller is further configured to calculate the power consumed by the motor based on the output current.

14. A laundry treatment machine, comprising:
   a washing tub;
   a washing tub motor configured to rotate the washing tub;
   a water level sensor configured to sense a water level of the washing tub;
   a drain pump configured to operate to drain the washing tub;
   a motor configured to operate the drain pump;
   a converter configured to output DC power;
   an inverter configured to convert the DC power from the converter into AC power by a switching operation and output the converted AC power to the motor; and
   a controller configured to, when a power consumed by the motor during the drainage operation is reduced while a water level frequency detected by the water level sensor is increased, determine the drainage as being completed and perform control to output the drainage completion message,
   wherein the controller is configured to:
      when a power supplied to the motor during a drainage operation does not reach a first power crease a speed of the motor or a power consumed by the motor,
      when the power supplied to the motor exceeds the first power decrease the speed of the motor, and
      while the power consumed by the motor remains within a first range corresponding to the first power, the water level frequency sensed by the water level sensor is constant and then increases, and during the increase in the water level frequency, when the power consumed by the motor falls from the first range, output the drainage completion message.

15. The laundry treatment machine of claim 14, wherein the controller is further configured to:
   perform power control so that the power consumed by the motor during the drainage operation is within the first range; and
   when the power consumed by the motor during the draining operation is out of the first range, determine the drainage operation as being completed and output the drainage completion message.

16. The laundry treatment machine of claim 15, wherein the controller is further configured to:
   when the power consumed by the motor during the drainage operation is out of the first range while a water level frequency detected by the water level sensor is increased, determine the drainage as being completed and perform control to output the drainage completion message.

17. The laundry treatment machine of claim 14, further comprising an output current detector configured to detect an output current flowing in the motor,
   the controller is further configured to calculate the power consumed by the motor based on the output current.

* * * * *